(12) United States Patent
Diefenbaugh et al.

(10) Patent No.: US 10,225,536 B2
(45) Date of Patent: *Mar. 5, 2019

(54) DYNAMIC FIDELITY UPDATES FOR ENCODED DISPLAYS

(71) Applicant: Intel Corporation, Santa Clara, CA (US)

(72) Inventors: Paul S. Diefenbaugh, Portland, OR (US); Jason Tanner, Folsom, CA (US); Kristoffer D. Fleming, Chandler, AZ (US); Vishal R. Sinha, Hillsboro, OR (US); Karthik Veeramani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/200,420

(22) Filed: Jul. 1, 2016

(65) Prior Publication Data

US 2018/0007371 A1 Jan. 4, 2018

(51) Int. Cl.

| | |
|---|---|
| *H04N 19/186* | (2014.01) |
| *G06F 17/30* | (2006.01) |
| *H04N 9/64* | (2006.01) |
| *H04N 21/41* | (2011.01) |
| *H04N 21/4363* | (2011.01) |
| *H04N 21/4402* | (2011.01) |

(52) U.S. Cl.
CPC ............... *H04N 9/64* (2013.01); *H04N 9/646* (2013.01); *H04N 21/4122* (2013.01); *H04N 21/4363* (2013.01); *H04N 21/440227* (2013.01); *G09G 2320/0242* (2013.01)

(58) Field of Classification Search
CPC ..................................................... H04L 47/25
See application file for complete search history.

(56) References Cited

U.S. PATENT DOCUMENTS

| 5,995,150 A * | 11/1999 | Hsieh | ..................... H04N 7/148 |
| | | | 348/E7.082 |
| 9,965,264 B2 * | 5/2018 | Fawcett | ..................... G06F 8/61 |
| 2007/0147247 A1* | 6/2007 | Kalonji | ..................... H04L 47/15 |
| | | | 370/235 |

(Continued)

*Primary Examiner* — Dave Czekaj
*Assistant Examiner* — Alison Slater
(74) *Attorney, Agent, or Firm* — Finch & Maloney PLLC

(57) ABSTRACT

Sink devices are provided that increase quality of displayed images by dynamically integrating higher fidelity update frames into a base stream encoded using an encoding technique (e.g., chroma-subsampling and/or another lossless encoding technique). Use of base image frames enables backward compatibility with existing technology and serves as a baseline for bandwidth scaling. The fidelity update frames may include raw image data, lossy, or losslessly compressed image data, and/or additional subsampled image data. The image data included in the fidelity update frames may apply to the entire base image frame or a portion thereof. The fidelity update frames may include incremental data or complete, high fidelity image data for a portion of an entire image. The sink devices may store and implement fidelity management policies that control operation of the devices to balance resource consumption against fidelity to meet the needs of specific operational environments.

21 Claims, 8 Drawing Sheets

(56) References Cited

U.S. PATENT DOCUMENTS

2015/0103926 A1\* 4/2015 Hannuksela ......... H04N 19/119
                                                                375/240.26
2015/0172616 A1   6/2015 Ye et al.
2016/0212433 A1\* 7/2016 Zhu ..................... H04N 19/136
2016/0360212 A1\* 12/2016 Dai ..................... H04N 19/186

\* cited by examiner

DYNAMIC FIDELITY UPDATES FOR ENCODED DISPLAYS

BACKGROUND

The human eye is less sensitive to changes in chrominance (chroma) than changes in luminance (luma). Conventional video processing systems leverage this fact to reduce the amount of data processing required to provide a level of fidelity acceptable to observers. For instance, some video encoders sample every pixel's luminance but subsample chrominance using any of a variety of subsampling schemes. Examples of these subsampling schemes include 4:2:2 and 4:2:0. While subsampling schemes generally provide good image quality, certain types of content (e.g., static content or content rendered in particular colors) may include artifacts that are perceptible by observers.

DETAILED DESCRIPTION

Figure 1:
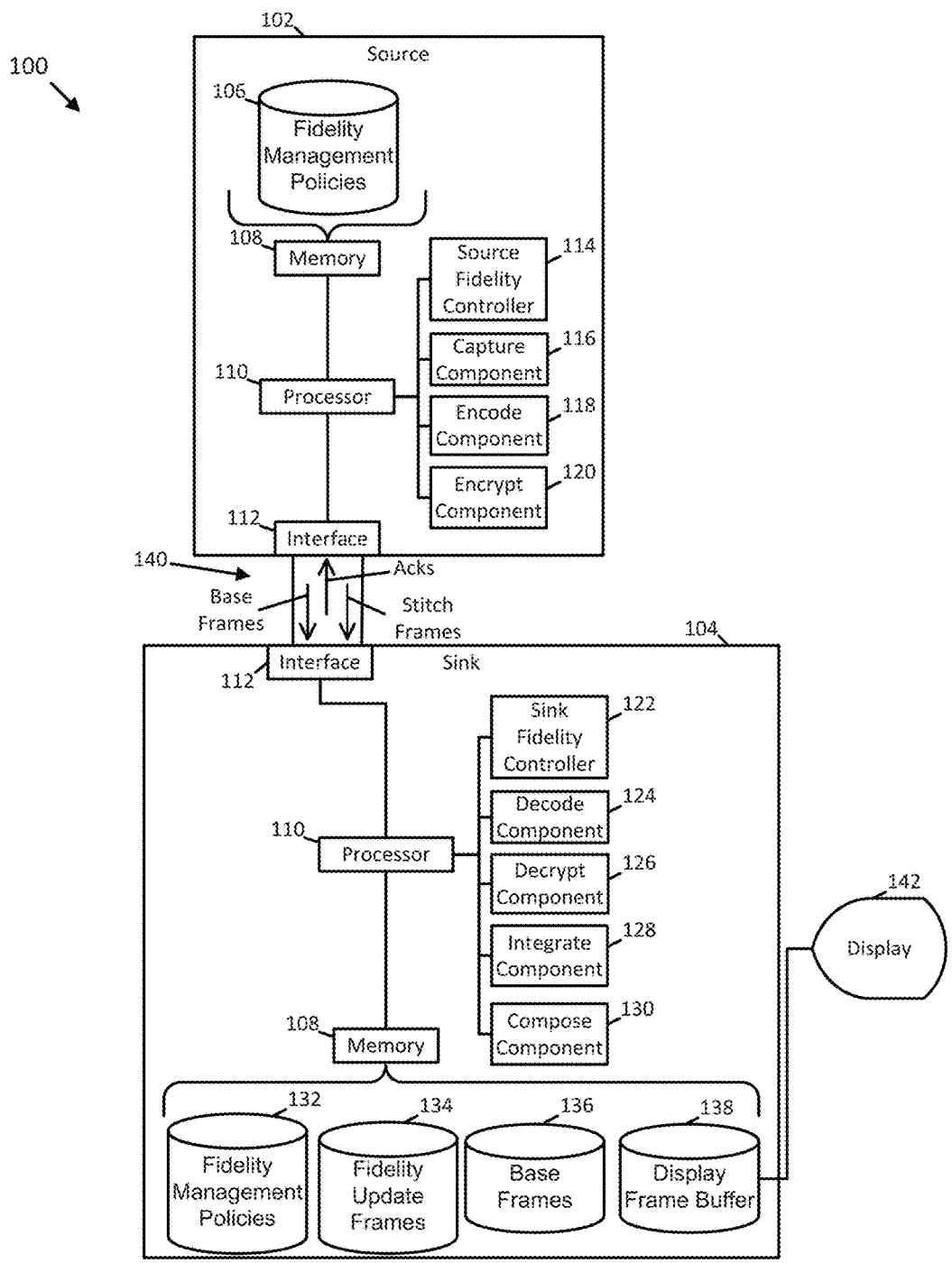
FIG. 1 illustrates a fidelity management system configured in accordance with an embodiment of the present disclosure.

Native 4:4:4 encoding requires substantially more processing and memory resources than 4:2:0 encoding, which results in higher residency, power usage, bandwidth usage, and when applied in the presence of system constraints, lower resolution. Fidelity management systems disclosed herein effectively and dynamically manage display fidelity in a manner that delivers outstanding user-perceived quality at lower bandwidth, energy, and latency. In some embodiments, these fidelity management systems are used with or within video encoding and/or streaming devices (e.g., Wi-Fi®, WiGig®, and Universal Serial Bus (USB) displays) to address a lack of 4:4:4 chroma sampling in existing hardware encoders and decoders. In addition, even where 4:4:4 hardware is present, some embodiments are used to mitigate the higher 4:4:4 encoding/decoding costs by switching between 4:2:0 (e.g. for highly active content) and 4:4:4 (e.g. for static content, such as text). In other embodiments, fidelity management systems dynamically switch between non-compressed (raw), slightly-compressed (e.g. lossless) and highly-compressed (lossy) display data streams. Thus, in these embodiments, fidelity management systems may provide fidelity updates for any lossy-encoded stream and not just for chroma subsampled streams (e.g. 4:2:0). Examples of these lossy-encoded streams include streams compressed using Moving Picture Experts Group (MPEG) Advanced Video Coding (AVC), MPEG High Efficiency Video Coding (HEVC), and Video Electronic Standards Association (VESA) Display Stream Compression (VDSC). Moreover, some embodiments provide high-fidelity display streams over Wi-Fi®, WiGig®, and USB using an encoder (which may implement AVC, HEVC, VP9, or another encoding scheme) as a source mated to industry-standard decoders (which may only support 4:2:0 encoding formats) as sinks across a wide range of workloads, bandwidth constraints, displays, and display resolutions. These configurations can result in delivery of fidelity equivalent or in some cases superior to a 4:4:4 encoding solution at roughly 1/10th the bandwidth. For USB applications, these configurations result in fidelity for productivity scenarios to approach that of a wired DisplayPort transport at roughly 1/100th the bandwidth.

The techniques disclosed herein may be particularly useful when displaying computer graphics, graphics overlaid on media, and/or mixed content (e.g., certain productivity content, web browsing content, and video conferencing content). This is so because it is with these types of content that chroma subsampling and compression artifacts are most noticeable to viewers.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

As previously explained, conventional techniques for processing image data (e.g., 4:2:0 encoding) benefit from subsampling chroma, but, this subsampling approach degrades image quality to a noticeable extent in some situations. In addition, while 4:4:4 encoding provides improved image quality, 4:4:4 encoding consumes substantially more resources than 4:2:0 encoding. Thus, and in accordance with some embodiments of the present disclosure, fidelity management systems are provided that increase the quality of displayed images by dynamically integrating higher fidelity update frames into a base stream encoded using an encoding technique (e.g., chroma-subsampling and/or another lossless encoding technique). The use of base image frames enables backward compatibility with existing technology (e.g., 4:2:0 subsampling) and serves as a baseline for bandwidth scaling as described further below. The fidelity update frames may include raw image data, lossy or losslessly compressed image data, and/or additional subsampled image data. In addition, the image data included in the fidelity update frames may be applicable to the entire base image frame or a portion thereof. Further the fidelity update frames may include incremental data (e.g., full U and V components to be integrated with a 4:2:0 encoded base image frame) or complete, high fidelity image data for a portion of an entire image (e.g., raw or 4:4:4 encoded image data for a portion of a base 4:2:0 encoded image frame).

Furthermore, the techniques described herein can be applied generally to any base stream where encoding incurs user-visible loss, even when chroma subsampling is not applied on the base stream (aka 4:4:4). Here fidelity update frames could employ any lossy (or less-lossy) encoding scheme including raw image data.

Figure 10:
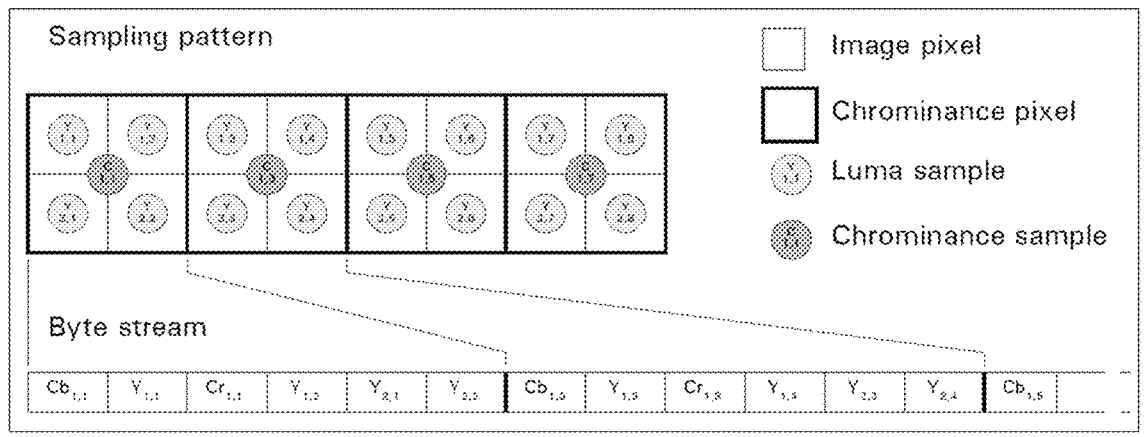
FIG. 10 illustrates the subsampling pattern and resulting data stream implemented by 4:2:0 encoding in accordance with an embodiment.
Figure 11:
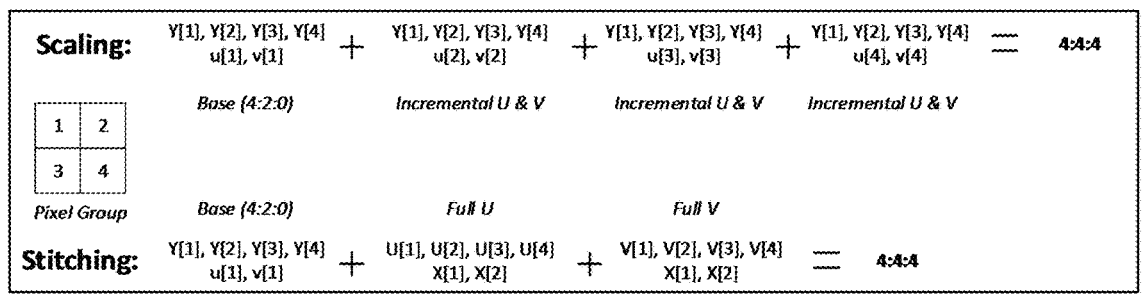
FIG. 11 illustrates two specific coding formats for fidelity update frames in accordance with an embodiment.

FIG. 10 illustrates an example pattern and resulting data stream implemented by 4:2:0 chroma subsampling. FIG. 11 illustrates two example coding formats for conveying fidelity update data between a source and a sink. Scaling techniques embed the additional fidelity update data within a higher-resolution 4:2:0 base frame (e.g. 3840×2160), which then can be extracted by the sink before downscaling the base frame to the native resolution (e.g. 1920×1080). Stitching techniques construct separate fidelity update frames corresponding to the native resolution (e.g. 1920×1080). As shown in FIG. 11, each of the scaling frames embed incremental chroma values (e.g., U and V) for individual pixels within the higher-resolution frame's 4:2:0 pixel group. Each of the stitching frames include either full U or full V chroma values for all pixels within the 4:2:0 pixel group. The stitching frames may conform to any of a variety of encoding schemes, such as raw (as may be expressed in YUV or RGB color models), higher-fidelity AVC/HEVC 4:4:4 (as may be expressed in a YUV color model), or any other lossless or lossy compression scheme.

Some embodiments of the fidelity management system identify and execute one or more fidelity management policies that describe whether and how to transmit, integrate, or "stitch," fidelity update frames associated with a base image frame. Execution of these fidelity management policies effectively and efficiently manages fidelity updates based on a variety of operational conditions (e.g., available transport bandwidth, frequency and magnitude of display updates, type of content (e.g. media vs. text), system thermal load, battery life, etc.). In executing a policy, the fidelity management system may execute any of a variety of stitching processes, which are described further below, and/or may not transmit and/or discard one or more fidelity update frames.

In some embodiments, after the fidelity management system stitches the base image frame with the fidelity update frames, the fidelity management system composes a display frame (e.g., in RBG format) and transmits the display frame to display for external presentation. These and other aspects of fidelity management systems are described further below.

System Architecture

FIG. 1 illustrates one example embodiment of a fidelity management system 100 that is configured to selectively display images at a superior quality level while decreasing the resources required to do so. The system 100 may be implemented using one or more programmable devices, such as may be fabricated using the platform components described below with reference to FIG. 12. As shown in FIG. 1, the system 100 includes a source device 102 and a sink device 104. In general, source devices identify and transmit frames of image data to sink devices, and sink devices receive and display images based on the frames. Examples of source devices include personal computers, smart phones, content streaming servers, two dimensional cameras, three dimensional (depth) cameras, and other device that transmit frames of image data. Examples of sink devices include wired displays, wireless displays, smart phones, and other devices that display images based on frames received from a source device. The wired and wireless displays may include computer displays, touchscreen displays, video monitors, television-like devices, and/or televisions and may be digital and/or analog. Additional examples of source and sink devices are described further below with reference to FIGS. 13-18.

As shown, the source device 102 and the sink device 104 are coupled to and exchange (e.g., send and/or receive) frames of image data via a data link 140. The data link 140 may be wired (e.g., Category 5 cable, Digital Visual Interface (DVI) cable, DisplayPort cable, video graphics array (VGA) cable, High-Definition Multimedia Interface (HDMI) cable, USB cable, etc.) or wireless (e.g., Wi-Fi®, WiGig®, ZigBee®, Bluetooth®, etc.). The frames exchanged may include image data encoded according to any of a variety of subsampling standards (e.g., 4:4:2, 4:2:2, and/or 4:2:0), and/or may be compressed according to any of a variety of compression standards (e.g., AVC, HEVC, VDSC). Separately, the frames exchanged may be encrypted according to any of a variety of encryption standards (e.g., High-bandwidth Digital Content Protection (HDCP)). In some embodiments, whether image data is encoded and/or encrypted depends on a codec being used by the source device 102 and the sink device 104. According to various embodiments, the frames exchanged may also include base frames and stitch frames. Also as shown in FIG. 1, the data link 140 may be utilized as a transport for other types of messages (e.g., acknowledgements transmitted by the sink device 104).

As shown in FIG. 1, both the source device 102 and the sink device 104 include a suite of components that are standard for a programmable device. These components are the processors 110, the memories 108, and the interfaces 112. Although the particular types and models of the standard components may vary between any two of the programmable devices described herein, it is appreciated that each programmable device includes a processor, memory, and an interface.

The interfaces 112 include one or more physical interface devices such as input devices, output devices, and combination input/output devices and a software stack configured to drive operation of the devices. Interface devices may receive input or provide output. More particularly, output devices may render information for external presentation and input devices may accept or generate information from external sources. Examples of interface devices include keyboards, mouse devices, trackballs, microphones, touch screens, printing devices, display screens, speakers, network interface cards, environmental sensors, and the like. Interface devices allow programmable devices to exchange information and communicate with external entities, such as users and other systems. In the example illustrated in FIG. 1, the interfaces 112 include ports, such as Ethernet, USB, and/or DVI ports.

The memories 108 include readable and/or writeable data storage that stores programs and data used or manipulated during operation of a programmable device. The programs stored in the memories 108 are a series of instructions that are executable by the processors 110. The memories 108 may include relatively high performance data storage, such as registers, caches, dynamic random access memory, and static memory. The memories 108 may further include a relatively low performance, non-volatile data storage medium such as flash memory or an optical or magnetic disk. Various embodiments may organize the memories 108 into particularized and, in some cases, unique structures to store data in support of the components disclosed herein. These data structures may be specifically configured to conserve storage space or increase data exchange performance and may be sized and organized to store values for particular data and types of data.

To implement specialized components in some embodiments, the processors 110 execute a series of instructions (i.e., one or more programs) that result in manipulated data. The processors 110 may be any type of processor, multi-processor, microprocessor, or controller known in the art. The processors 110 are connected to and communicate data with the memories 108 and the interfaces 112 via an interconnection mechanism, such as a bus or some other data connection. This interconnection mechanism is represented in FIG. 1 by lines connecting the components within each illustrated programmable device. In operation, the processors 110 cause data to be read from a non-volatile (i.e., non-transitory) data storage medium in the memories 108 and written to high performance data storage. The processors 108 manipulate the data within the high performance data storage and copy the manipulated data to the data storage medium after processing is completed.

Although the source device 102 and the sink device 104 are shown as examples of programmable devices capable of executing the processes disclosed herein, embodiments are not limited to the programmable devices shown in FIG. 1. For example, various processes may be executed by one or more programmable devices having a different architectures or components than those shown in FIG. 1. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a programmable device as disclosed herein may be implemented in software, hardware, firmware, or any combination thereof.

In addition to the suite of standard components described above, the source device 102 and the sink device 104 include several customized components that collectively generate and output image data with fidelity tailored to a particular operating environment. For example, the source device 102 includes a fidelity management policies data store 106, a source fidelity controller 114, a capture component 116, an encode component 118, and an encrypt component 120. As shown, the fidelity management policies data store 106 resides within in the memory 108 of the source device 102. The sink device 104 also includes customized components in the form of a sink fidelity controller 122, a decode component 124, a decrypt component 126, an integrate component 128, a compose component 130, a fidelity management policies data store 132, a stitch frames data store 134, a base frames data store 136, a display frame buffer 138, and a display screen 142. As shown, the fidelity management policies data store 132, the stitch frames data store 134, the base frames data store 136, and the display frame buffer 138 reside in the memory 108 of the sink device 104.

In some embodiments, at least some of the customized components in FIG. 1 are implemented using ASICs. In other embodiments, at least some of the customized components in FIG. 1 are implemented by the processor 110 of the device including the component. As described above, this processor 110 may be general purpose processor. However, when executing a specific software process as described herein (e.g., as depicted in any of FIGS. 2-9) or constructing specific data structures as provided herein (e.g., as depicted in either of FIGS. 10 and 11), the processor 110 becomes a special purpose processor capable of making specific logic-based determinations based on input data received, and further capable of providing one or more outputs that can be used to control or otherwise inform subsequent processing to be carried out by the processor 110 and/or other processors or circuitry with which processor 110 is communicatively coupled. The processor 110 reacts to specific input stimulus in a specific way and generates a corresponding output based on that input stimulus. In this sense, the structure of processor 110 according to one embodiment is defined by the flow charts shown in any of FIGS. 2-9 and this structure implements the data model illustrated in FIGS. 10 and 11. Moreover, in some example cases, the processor 110 proceeds through a sequence of logical transitions in which various internal register states and/or other bit cell states internal or external to the processor may be set to logic high or logic low. This specific sequence of logic transitions is determined by the state of electrical input signals to the processor 110 and a special-purpose structure is effectively assumed by the processor 110 when executing each software instruction of the software processes shown in FIGS. 2-9. Specifically, those instructions anticipate the various stimulus to be received and change the implicated memory states accordingly. In this way, the processor 110 may generate and store or otherwise provide useful output signals. Thus, it is appreciated that the processor 110, during execution of a software process becomes a special purpose machine, capable of processing only specific input signals and rendering specific output signals based on the one or more logic operations performed during execution of each software instruction. In at least some examples, the processor 110 is configured to execute a function where software is stored in a data store coupled with the processor 110 (e.g., the memory 108) and that software is configured to cause the processor 110 to proceed through a sequence of various logic operations that result in the function being executed.

In some embodiments, the source fidelity controller 114 of the source device 102 is configured to monitor and control the operation of the other components of the source device 102. When executing according to its configuration in some embodiments, the source fidelity controller 114 identifies one or more fidelity management policies stored in the fidelity management policy data store 106 and executes the one or more identified policies. These fidelity management policies specify which components of the source device 102 should be executed in particular, predefined situations. For instance, when executing a fidelity management policy, the source fidelity controller 114 may detect one or more attributes of its configuration and/or the current operating environment, identify one or more fidelity management policies stored in the fidelity management policy data store 106 applicable to the current operating environment in light of its configuration, and use the capture 116, encode 118, encrypt 120, and interface 112 components to generate and transmit a frame of image data to the sink device 104. One example of a control process executed by the source fidelity controller 114 to implement fidelity management policies 106 is described further below with reference to FIG. 2.

In some embodiments in accordance with FIG. 1, the capture component 116 is configured to acquire and/or identify a frame of image data for subsequent processing. This processing may include transmission of the frame or a frame derived from the frame. When executing according to its configuration, the capture component 116 acquires frames of image data from an image file stored on a computer readable medium, such as an optical disk, magnetic disk, flash memory, or other form of data storage. In operation, the capture component 116 may capture a frame in response to receiving image data or in response to receiving an instruction to do so from the source fidelity controller 114.

In some embodiments, the encode component 118 is configured to receive captured frames of image data and to decrease the bandwidth required to store and/or transmit the frames. When executing according to its configuration, the encode 118 component may, for example, subsample the frame into a 4:4:2, 4:2:2, 4:2:0, etc. frame and/or compress the image data in the frame according to AVC, HEVC, VDSC, etc. In operation, the encoder component 118 may encode image data in response to receiving image data or in response to receiving an instruction to do so from the source fidelity controller 114.

In some embodiments, the encrypt component 120 is configured to receive captured frames and/or encoded frames and to protect the content of the frames from unauthorized review. When executing according to its configuration, the encrypt component 120 may, for example, encrypt image data in the frame using HDCP. In operation, the encrypt component 120 may protect image data in response to receiving image data or in response to receiving an instruction to do so from the source fidelity controller 114.

In some embodiments, the sink fidelity controller 122 of the sink device 104 is configured to monitor and control the operation of the other components of the sink device 104. When executing according to its configuration in some embodiments, the sink fidelity controller 122 detects receipt of frames of image data by the interface 112 of the sink device 104, identifies one or more fidelity management policies applicable to subsequent processing of the received frames, and executes the one or more identified fidelity management policies 132. These fidelity management policies 132 specify which components of the sink device 104 should be executed in particular, predefined situations. For instance, when executing a fidelity management policy, the sink fidelity controller 122 may identify a type (e.g., base or fidelity update) for each received frame, store each received frame in either the fidelity update frames data store 134 or the base frames data store 136, and process the received frames using the decode 124, decrypt 126, integrate 128, and compose 130 components to generate and store a frame of image data for display within the display frame buffer 138. One example of a control process executed by the sink fidelity controller 122 to implement fidelity management policies 132 is described further below with reference to FIG. 3.

In some embodiments in accordance with FIG. 1, the decode component 124 is configured to receive a frame of encoded image data and decode the encoded image data. When executing according to this configuration, the decode component 124 may execute a decoding operation by default in response to receiving encoded image data or in response to an instruction received from the sink fidelity controller 122. These decoding operations may include decompressing image data in the frame according to AVC, HEVC, VDSC, etc.

In some embodiments in accordance with FIG. 1, the decrypt component 126 is configured to receive a frame of encrypted image data and decrypt the encrypted image data. When executing according to this configuration, the decrypt component 126 may execute a decryption operation by default in response to receiving encrypted image data or in response to an instruction received from the sink fidelity controller 122. These decryption operations may include decrypting image data in a frame according to HDCP, among other encryption protocols.

In some embodiments, the integrate component 128 is configured to receive frames of varying types (base frames and/or fidelity update frames) and to dynamically switch between these frame types in accordance with one or more identified and applicable fidelity management policies 132.

In at least one embodiment illustrated by FIG. 1, integrate component 128 is configured to read frames (e.g., decoded and/or decrypted, as may be the case) stored in the fidelity update frames data store 134 and the base frame data store 136 and to stitch these frames to produce high fidelity image data. FIGS. 4-9 depict some of the actions that the integrate component 128 is configured to execute in response instructions received by the sink fidelity controller 122 in various embodiments.

In one embodiment illustrated by FIG. 1, the composer 120 is configured to compose an image for presentation based on an integrated frame generated by the integrate component 128 and store the composed image (e.g., as a set of pixels in RGB format) in the display frame buffer 138. The image described in the display frame buffer 138 may then be presented on the display screen 142 coupled to or integral with the sink device 104.

Methodology

Figure 2:
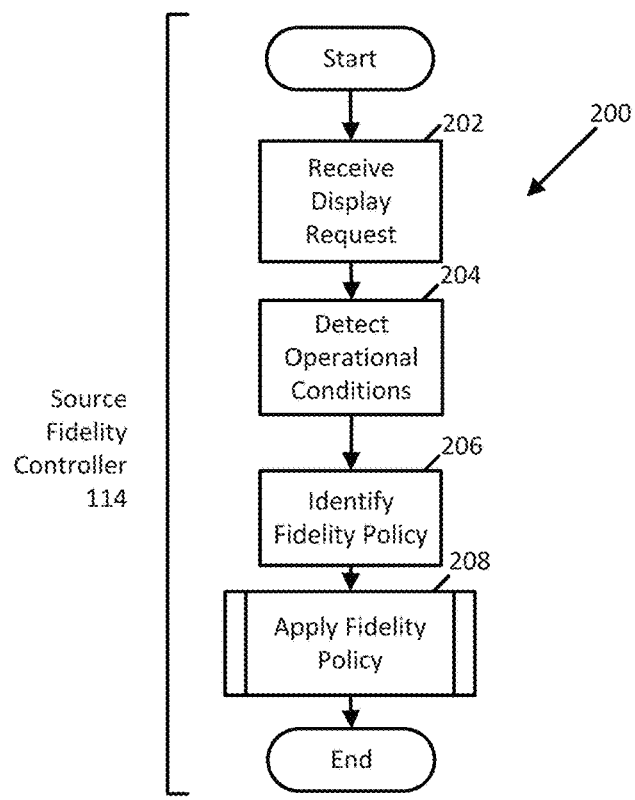
FIG. 2 illustrates a fidelity policy management process in accordance with an embodiment of the present disclosure.

According to some embodiments, a fidelity management system (e.g., the fidelity management system 100) executes processes that monitor and control components to comply with one or more fidelity management policies. FIG. 2 illustrates a monitoring and control process 200 in accord with these embodiments. As shown in FIG. 2, the control process 200 includes several acts that, in combination, enable the fidelity management system to consume only the resources needed to provide a high level of image quality under constraints imposed by the current operating environment.

In some embodiments, the control process 200 is executed by a source device (e.g., the source device 102). In these embodiments, the fidelity management policies implemented via the control process 200 may, for example, manage bandwidth required to transmit a requested series of image frames via a data link (e.g., the data link 140); manage compute bandwidth required to capture, encode, and encrypt the requested frames; manage power required to process and transmit the requested frames; manage the temperature of the source device and/or a sink device (e.g., the sink device 104) in rendering the requested frames; and manage the overall activity of the source device where the frames are requested to be transmitted to multiple sink devices.

The control process 200 starts in act 202 with a source fidelity controller (e.g., the source fidelity controller 114) receiving a request to display a series of frames from an external component. This external component may include, for example, a user interface component, a scheduling component, or some other component designed to initiate display of a series of frames (e.g., a video game, web browser, etc.).

In act 204, the source fidelity controller responds to receipt of the request by detecting conditions of its operating environment used to identify a fidelity management policy applicable to the current operating environment. In some embodiments, within the act 204 the source fidelity controller reads configuration information from a data store (e.g., the fidelity management policies data store 106) that specifies a fidelity management policy that is currently selected (e.g., via a flag or some other indicator). In other embodiments, within the act 204 the source fidelity controller acquires and/or calculates information descriptive of current conditions within its operating environment. For example, to enable effective management of data link bandwidth, the source fidelity controller may, within the act 204, calculate an amount of time transpired between transmission of a frame and reception of an acknowledgement from the sink device. In another example, to enable effective management of compute bandwidth, the source fidelity controller may, within the act 204, determine a speed of a processor (e.g., the processor 110) of the source device. To enable effective management of energy usage, the source fidelity controller may, within the act 204, calculate a metric (e.g. a ratio) that relates power required to subsample, compress, and/or encrypt a frame of image data to power required to transmit a raw version of the frame. To enable effective management of temperature, the source fidelity controller may, within the act 204, sample the temperature of the source or sink device. In another example, to enable effective scaling of sinks, the source fidelity controller may, within the act 204, calculate a number of sink devices coupled to and receiving frames from the source device. In another example, the source fidelity controller may, within the act 204, track the number of active frames (e.g., where an "active" frame includes a change to the image to be displayed) and/or an amount of activity (e.g., dirty area as a percentage of the entire screen) and base identify a fidelity management policy, such as any disclosed herein. It is appreciated that other operational conditions may be used to identify applicable fidelity management policies, and the embodiments disclosed herein are not limited to a particular set of operational conditions or fidelity management policies.

In act 206, the source fidelity controller identifies one or more fidelity management policies applicable to its current configuration and/or operating environment. This identification may include searching for an applicable policy within a cross-reference (e.g., an array, database table, etc.) that associates fidelity management policies with sets of operational conditions. In at least one embodiment, when searching the source fidelity controller determines a match exists where values in the cross-reference are in a predefined relationship with (e.g., equal to or within a predefined range or distance of) the values subject to the search (e.g., the current operating conditions). The current operating conditions searched for may include any of the operating condition determined within the act 204 above. Where no match is found, the source fidelity controller may select a default fidelity management policy for application.

In act 208, the source fidelity controller applies one or more fidelity management policies identified in the act 206. Application of these policies may include initiation and/or termination of frame subsampling, compression, and/or encryption, as needed for the sink to render high quality images within system constraints.

For example, where the data link bandwidth is too low to consistently support communication of raw 4:4:4 frames (e.g., as may be indicated by the time calculated in act 204 above), the fidelity management policy identified in the act 206 may specify subsampling and/or encoding to decrease the link bandwidth consumed by base and/or fidelity update frames. Where the processor is not fast enough to consistently encode and/or encrypt at high resolution (e.g., 4 k), bit depth (e.g., 10, 12, or 16 bits per pixel-component), or refresh rate (e.g., 60/90/120 Hz), as may be indicated by the processor speed determined in the act 204 above, the fidelity management policy identified in the act 206 may specify less processor-intense encoding (e.g., HEVC 4:2:0) for base frames or, link bandwidth allowing, may specify transmission of raw 4:2:0 or 4:4:4 base frames with no compression. Where power usage is a concern (e.g., in battery powered or passively cooled source devices), the fidelity management policy identified in the act 206 may specify more or less encoding depending on the effect of the encoding on overall source device power consumption (e.g., as may be indicated by the value of the metric calculated in the act 204 above)

and/or may specify less frequent transmission of fidelity updates. Where the operating temperature of the source or sink device transgresses a threshold value (e.g., as may be indicated by the temperature sampled in the act 204 above), the fidelity management policy identified in the act 206 may specify less encoding and/or may specify less frequent transmission of fidelity update frames. Where the number of sink devices transgresses a threshold value (e.g., as may be indicated by the number of sink devices calculated in the act 204 above), the fidelity management policy identified in the act 206 may specify less encoding and/or less frequent transmission of fidelity update frames as the net effective activity across all sink devices increases. Conversely, this fidelity management policy may specify more encoding and/or more frequent transmission of fidelity update frames as the net effective activity across all sink devices increases and/or display activity becomes focused on fewer than a threshold number of displays. After the act 208, the control process 200 ends.

Figure 3:
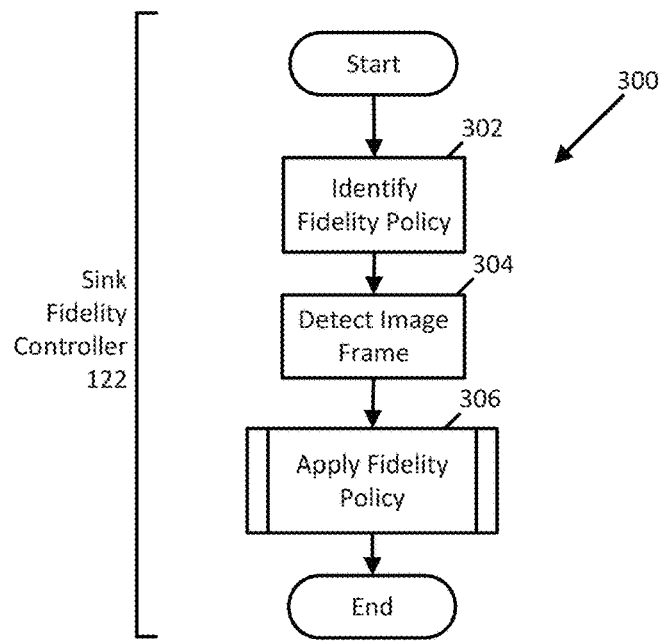
FIG. 3 illustrates another fidelity policy management process in accordance with an embodiment of the present disclosure.

FIG. 3 illustrates a monitoring and control process 300 in accord with some embodiments. As shown in FIG. 3, the control process 300 includes several acts that, in combination, enable the fidelity management system to consume only the resources needed to provide a high level of image quality under constraints imposed by the current operating environment. In some embodiments, the control process 300 is executed by a sink device (e.g., the sink device 104). In these embodiments, the fidelity management policies implemented via the control process 300 may, for example, manage latency between display of sequential base image frames where image quality is a secondary concern, ensure high fidelity images where image quality is a primary concern, and manage situations in which a data link (e.g. the data link 140) is unreliable.

The control process 300 starts in the act 302 with a sink fidelity controller (e.g., the sink fidelity controller 122) identifying a fidelity management policy applicable to its subsequent operation. In some embodiments, within the act 302, to identify an applicable fidelity management policy the sink fidelity controller reads configuration information from a data store (e.g., the fidelity management policies data store 132) that specifies a fidelity management policy that is currently selected (e.g., via a flag or some other indicator). In other embodiments, within the act 302 the sink fidelity controller identifies an applicable fidelity management policy by parsing a message received from a source device (e.g., the source device 102) via the data link. In some embodiments, the fidelity management policy identified by the sink fidelity controller is either a latency-biased policy or a fidelity-biased policy, each of which is described further below.

In act 304, the sink fidelity controller detects receipt of a frame of image data via an interface (e.g., the interface 112 of the sink device 104). In some embodiments, the frame of image data is either a base frame or a fidelity update frame. In act 306, the sink fidelity controller applies one or more fidelity policies identified in the act 302. Application of these policies may include acts such as displaying images based on base image frames, displaying images based on base image frames stitched with fidelity update frames, and discarding fidelity update frames (e.g., where the current temperature of the display has transgressed a threshold value, where the remaining runtime of a power source driving the display has transgressed a threshold value, or where a duration of time between the current time and a time when an image based on a previous base frame was stored in a display frame buffer has transgressed a threshold value).

For instance, where the sink fidelity controller identifies a latency-biased policy in the act 302, within the act 306 the sink fidelity controller maintains an activity metric that indicates overall display activity (e.g., average time between receipt of sequential base frames). A relatively inactive display may be associated with display of static images and/or text whereas a relatively active display may be associated with full-screen gaming, media playback, bandwidth-limited and/or related usages. Where this metric transgresses a threshold (thus indicating the sink fidelity controller has time to process fidelity update frames prior to receipt of the next base frame), the sink fidelity controller stitches the fidelity update frames with the previously received base frame, composes an image frame for display, and stores the display image frame in a display frame buffer (e.g., the display frame buffer 138). Where the metric fails to transgress a threshold (thus indicating the sink fidelity controller may not have time to process fidelity update frames prior to receipt of the next base frame), the sink fidelity controller does not stitch fidelity update frames to the previously received base frame. In some examples, the sink fidelity controller transmits a message to the source device if the sink fidelity controller is able or unable to stitch the fidelity update frames to the base frame, so that the source device may address this situation in future frames (e.g., by altering the number of base frames or the number fidelity update frames it transmits).

In an example where the sink fidelity controller identifies a fidelity-biased policy in the act 302, within the act 306 the sink fidelity controller consistently stitches fidelity update frames to the previously received base frame to ensure high fidelity images. More specifically, when executing a fidelity-biased policy in at least one embodiment, within the act 306 the sink fidelity controller maintains an activity metric that indicates overall display activity (e.g., average time between display of sequential base frames). A relatively inactive display may be associated with display of static images and/or text whereas a relatively active display may be associated with full-screen gaming, media playback, bandwidth-limited and/or related usages. Unless this metric transgresses a threshold (thus indicating the sink fidelity controller may have to skip more than acceptable number of base frames if it continues to stitch fidelity update frames), the sink fidelity controller stitches the fidelity update frames with the previously received base frame, composes an image frame for display, and stores the display image frame in a display frame buffer (e.g., the display frame buffer 138). Where the metric transgresses a threshold (thus indicating the sink fidelity controller may not have time to process fidelity update frame without dropping too many base frames), the sink fidelity controller does not stitch fidelity update frames to the previously received base frame. This fidelity management policy is well suited for applications, such as medical imaging, that require high fidelity.

In some examples, the sink fidelity controller transmits a message to the source device if the sink fidelity controller is unable to stitch the fidelity update frames to the base frame prior to receipt of a subsequent base frame, so that the source device may address this situation in future frames. It is appreciated that by closing a feedback loop with the source device in this manner, the sink fidelity controller helps to manage situations in which the data link is unreliable. This closed loop may, for instance, enable the source device to retransmit unapplied fidelity update frames in the future. Additional examples of actions executed during application of fidelity management policies are described further below with reference to FIGS. 4-9. After the act 306, the control process 300 ends.

Figure 4:
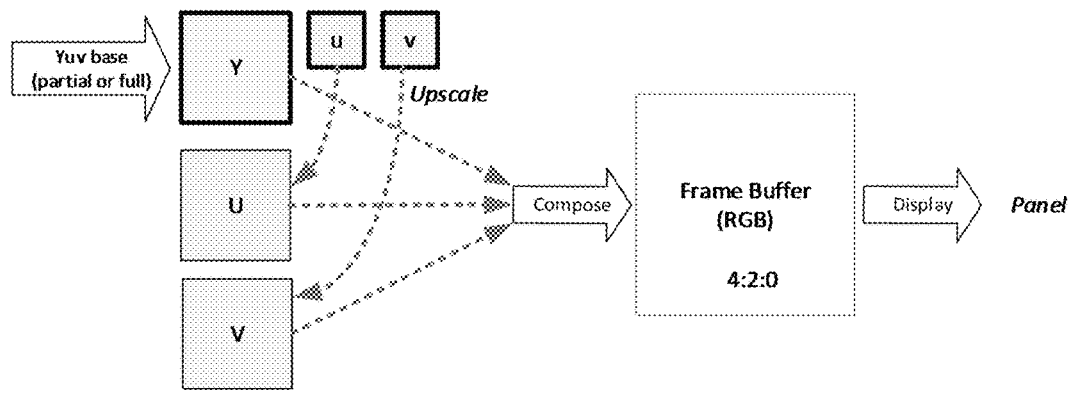
FIG. 4 illustrates a fidelity policy application process in accordance with an embodiment of the present disclosure.

FIG. 4 illustrates actions executed by a sink fidelity controller (e.g., the sink fidelity controller 122) when applying a fidelity management policy in some embodiments. The actions illustrated in FIG. 4 are consistent with a latency-biased fidelity management policy and/or a fidelity management policy configured to manage a relatively active display (e.g., as may be indicated by the activity metric described above in the act 306). Where the display is relative active, it is likely that the source device will not transmit fidelity update frames, and this likelihood is reflected in the applicable fidelity management policy.

As shown in FIG. 4, a lower-fidelity, full or partial base image frame is received by the sink device via an interface (e.g., the interface 112 of the sink device 104). In response to receipt of the base image frame, the sink fidelity controller applies the applicable fidelity management policy to further process of the base image frame. The applicable fidelity management policy specifies that the sink fidelity controller execute a number of actions as follows. First, if the base image frame is encrypted, the sink fidelity controller transmits a request to a decrypt component (e.g., the decrypt component 126) to decrypt the base image frame. Next, if the base image frame is encoded and/or compressed, the sink fidelity controller transmits a request to a decode component (e.g., the decode component 124) to decompress and/or decode the base image frame. Next, the sink fidelity controller transmits a request to an integrate component (e.g., the integrate component 128) to parse the base image frame and to upscale the subsampled 'u' and 'v' components to generate U and V. Where the base image frame is a partial image frame, the integrate component identifies a base image frame corresponding to the partial image frame by, for example, matching identifiers included in the partial image frame to an identifier of the base image frame. Next, the integrate component determines the location of the partial image within its corresponding base image either explicitly (e.g., by inspecting metadata included as a header within the frame) or implicitly (e.g., by inspecting the macroblock encoding of the frame). Next, the sink fidelity controller transmits a request to a compose component (e.g., the compose component 130) to compose, based on the Y, U, and V components, a set of RGB image data in a display frame buffer (e.g., the display frame buffer 138) for output to a display (e.g., the display 142).

Figure 5:
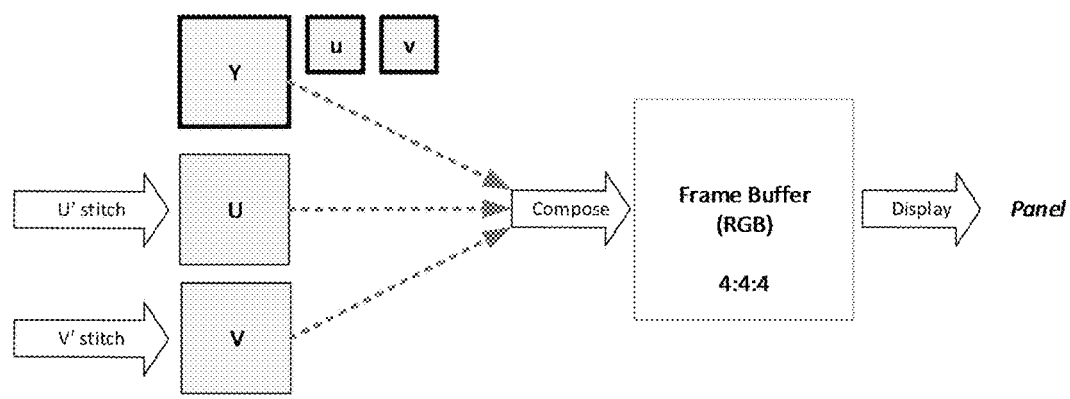
FIG. 5 illustrates another fidelity policy application process in accordance with an embodiment of the present disclosure.

FIG. 5 illustrates actions executed by a sink fidelity controller (e.g., the sink fidelity controller 122) when applying a fidelity management policy in some embodiments. The actions illustrated in FIG. 5 are consistent with a fidelity-biased fidelity management policy and/or a fidelity management policy configured to manage a relatively inactive display (e.g., as may be indicated by the activity metric described above in the act 306).

As shown in FIG. 5, fidelity update frames (U' and V' stitching frames) are received by a sink device (e.g., the sink device 104) via an interface (e.g., the interface 112 of the sink device 104). In response to receipt of the fidelity update frames, the sink fidelity controller applies an applicable fidelity management policy to further process the fidelity update frames. This policy specifies that the sink fidelity controller execute a number of actions as follows. First, the sink fidelity controller identifies a base image frame corresponding to the fidelity update frames by, for example, matching identifiers included in the fidelity update frames to an identifier of the base image frame. This base image frame may be stored in, for example, in a data store (e.g., the base frames data store 136). Next, if the fidelity update frames are encrypted, the sink fidelity controller transmits a request to a decrypt component (e.g., the decrypt component 126) to decrypt the base image frame. Next, if the fidelity update frames are encoded and/or compressed, the sink fidelity controller transmits a request to a decode component (e.g., the decode component 124) to decompress and/or decode the fidelity update frames. Next, the sink fidelity controller transmits a request to an integrate component (e.g., the integrate component 128) to parse the fidelity update frames and to integrate the fidelity update frames with the base image frame. Next, the sink fidelity controller transmits a request to a compose component (e.g., the compose component 130) to compose a set of RGB image data in a display frame buffer (e.g., the display frame buffer 138) for output to a display (e.g., the display 142). In some embodiments, the integrate component integrates (e.g., stitches) the fidelity update frames with the base image frame by replacing the u and v components of the base frame with U' and V' components included in the fidelity update frames. In embodiments where the fidelity update frames are scaling frames, the integrate component integrates the scaling frames by augmenting the u and v components of the base frame with the incremental u and v components in the scaling frames.

Figure 6:
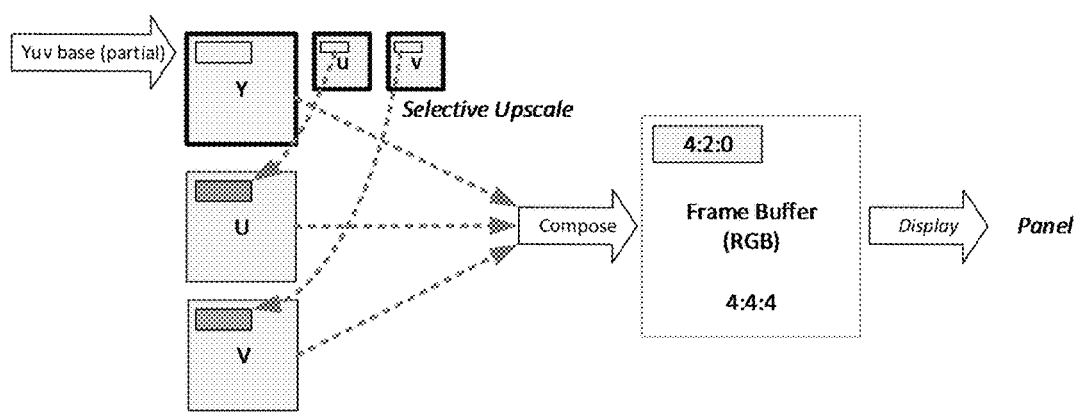
FIG. 6 illustrates another fidelity policy application process in accordance with an embodiment of the present disclosure.

FIG. 6 illustrates actions executed by a sink fidelity controller (e.g., the sink fidelity controller 122) when applying a fidelity management policy in some embodiments. The actions illustrated in FIG. 6 are consistent with a latency-biased fidelity management policy and/or a fidelity management policy configured to manage a relatively active display (e.g., as may be indicated by the activity metric described above in the act 306).

As shown in FIG. 6, a lower-fidelity, partial base image frame is received by the sink device via an interface (e.g., the interface 112 of the sink device 104). In response to receipt of the partial base image frame, the sink fidelity controller applies an applicable fidelity management policy to further process the partial base image frame. This policy specifies that the sink fidelity controller execute a number of actions as follows. First, the sink fidelity controller identifies a base image frame corresponding to the partial base image frame by, for example, matching an identifier included in the partial base image frame to an identifier of the base image frame. Next, if the partial base image frame is encrypted, the sink fidelity controller transmits a request to a decrypt component (e.g., the decrypt component 126) to decrypt the partial base image frame. Next, if the partial base image frame is encoded and/or compressed, the sink fidelity controller transmits a request to a decode component (e.g., the decode component 124) to decompress and/or decode the partial base image frame. Next the sink fidelity controller transmits a request to an integrate component (e.g., the integrate component 128) to parse the partial base image frame, to selectively upscale the subsampled, partial 'u' and 'v' components to generate partial U and V components and to integrate the partial U and V components with the previous U and V components (e.g., by replacing portions of the previous U and V components with the partial U and V components). During its processing, the integrate component may determine the location of the partial image within its corresponding base image either explicitly (e.g., by inspecting metadata included as a header within the frame) or implicitly (e.g., by inspecting the macroblock encoding of the frame). Next, the fidelity controller transmits a request to a compose component (e.g., the compose component 130) to compose a set of RGB image data in a display frame buffer (e.g., the display frame buffer 138) for output to a display (e.g., the display 142). As shown, in FIG. 6, the display frame buffer includes image data derived from a previous base image frame (encoded and decoded using 4:4:4) and the partial base image frame (encoded and decoded using 4:2:0).

Figure 7:
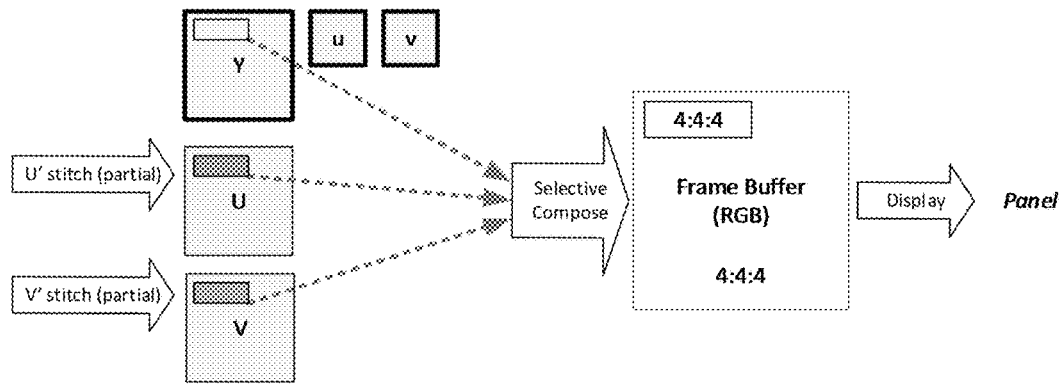
FIG. 7 illustrates another fidelity policy application process in accordance with an embodiment of the present disclosure.

FIG. 7 illustrates actions executed by a sink fidelity controller (e.g., the sink fidelity controller 122) when applying a fidelity management policy in some embodiments. The actions illustrated in FIG. 7 are consistent with a fidelity-biased fidelity management policy and/or a fidelity management policy configured to manage a relatively inactive display (e.g., as may be indicated by the activity metric described above in the act 306).

As shown in FIG. 7, partial fidelity update frames (partial U' and V' stitching frames) are received by the sink device via an interface (e.g., the interface 112 of the sink device 104). In response to receipt of the partial fidelity update frames, the sink fidelity controller applies an applicable fidelity management policy to further process the partial fidelity update frames. This policy specifies that the sink fidelity controller execute a number of actions as follows. First, the sink fidelity controller identifies a base image frame corresponding to the partial fidelity update frames by, for example, matching identifiers included in the partial fidelity update frames to an identifier of the base image frame. Next, if the partial fidelity update frames are encrypted, the sink fidelity controller transmits a request to a decrypt component (e.g., the decrypt component 126) to decrypt the partial fidelity update frames. Next, if the partial fidelity update frames are encoded and/or compressed, the sink fidelity controller transmits a request to a decode component (e.g., the decode component 124) to decompress and/or decode the partial fidelity update frames. Next, the sink fidelity controller transmits a request to an integrate component (e.g., the integrate component 128) to parse the partial fidelity update frames and to integrate the partial fidelity update frames with the base image frame. During its processing, the integrate component may determine the location of the partial fidelity updates within the corresponding base image either explicitly (e.g., by inspecting metadata included as a header within the frames) or implicitly (e.g., by inspecting the macroblock encoding of the frames). Next, the sink fidelity controller transmits a request to a compose component (e.g., the compose component 130) to compose a set of RGB image data in a display frame buffer (e.g., the display frame buffer 138) for output to a display (e.g., the display 142). In some embodiments, the integrate component integrates the partial fidelity update frames with the base image frame by replacing the portions of U and V components of the previous base frame with U' and V' components included in the partial fidelity update frames.

Figure 8:
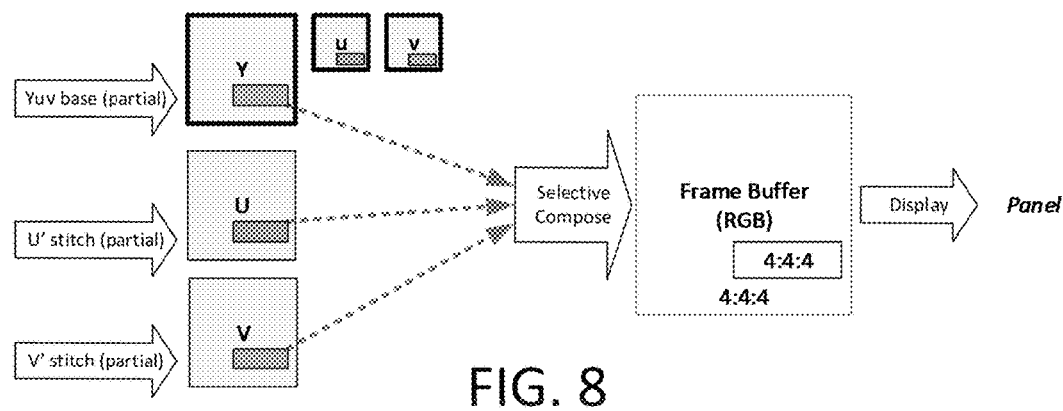
FIG. 8 illustrates another fidelity policy application process in accordance with an embodiment of the present disclosure.

In some embodiments, the actions illustrated in FIGS. 6 and 7 are integrated such the compose component need only act once to store composed image data in the display frame buffer. FIG. 8 illustrates one example of such an embodiment.

FIG. 8 illustrates actions executed by a sink fidelity controller (e.g., the sink fidelity controller 122) when applying a fidelity management policy in some embodiments. The actions illustrated in FIG. 8 are consistent with a fidelity-biased fidelity management policy and/or a fidelity management policy configured to manage a relatively inactive display (e.g., as may be indicated by the activity metric described above in the act 306).

As shown in FIG. 8, a lower-fidelity, partial base image frame and partial fidelity update frames (partial U' and V' stitching frames) are received by the sink device via an interface (e.g., the interface 112 of the sink device 104). In response to receipt of the partial base image frame and partial fidelity update frames, the sink fidelity controller applies an applicable fidelity management policy to further process the partial base image frame and partial fidelity update frames. This policy specifies that the sink fidelity controller execute a number of actions as follows. First, the sink fidelity controller identifies a base image frame corresponding to the partial base image frame and partial fidelity update frames by, for example, matching identifiers included in the partial base image frame and partial fidelity update frames to an identifier of the base image frame. Next, if the partial base image frame and partial fidelity update frames are encrypted, the sink fidelity controller transmits a request to a decrypt component (e.g., the decrypt component 126) to decrypt partial base image frame and partial fidelity update frames. Next, if the partial base image frame and partial fidelity update frames are encoded and/or compressed, the sink fidelity controller transmit a request to a decode component (e.g., the decode component 124) to decompress and/or decode the partial base image frame and partial fidelity update frames. Next, the sink fidelity controller transmits a request to parse the partial base image frame and partial fidelity update frames, to an integrate component (e.g., the integrate component 128) to integrate the partial fidelity update frames (U' and V' chroma components) and the partial base image frame (Y luma component) with the base image frame. During its processing, the integrate component may determine the location of the partial base image and the partial fidelity updates within the corresponding base image either explicitly (e.g., by inspecting metadata included as a header within the frames) or implicitly (e.g., by inspecting the macroblock encoding of the frames). Next, the sink fidelity controller transmits a request to a compose component (e.g., the compose component 130) to compose a set of RGB image data in a display frame buffer (e.g., the display frame buffer 138) for output to a display (e.g., the display 142). In some embodiments, the integrate component integrates the partial fidelity update frames with the base image frame by replacing the portions of U and V components of the previous base frame with U' and V' components included in the partial fidelity update frames.

Figure 9:
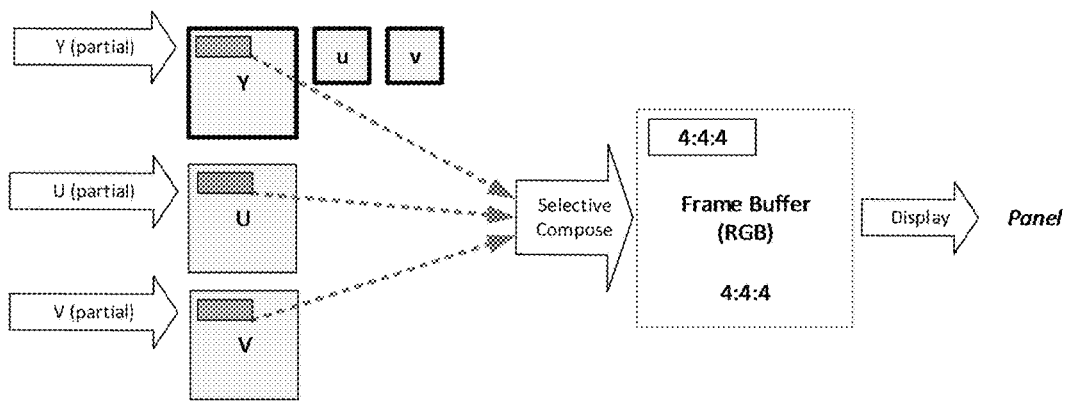
FIG. 9 illustrates another fidelity policy application process in accordance with an embodiment of the present disclosure.

FIG. 9 illustrates actions executed by a sink fidelity controller (e.g., the sink fidelity controller 122) when applying a fidelity management policy in some embodiments. The actions illustrated in FIG. 9 are consistent with a fidelity-biased fidelity management policy and/or a fidelity management policy configured to manage a relatively inactive display (e.g., as may be indicated by the activity metric described above in the act 306).

As shown in FIG. 9, partial fidelity update frames (partial U, V, and Y frames) are received by the sink device via an interface (e.g., the interface 112 of the sink device 104). In response to receipt of the partial fidelity update frames, the sink fidelity controller applies a fidelity management policy to further process the partial fidelity update frames. This policy specifies that the sink fidelity controller execute a number of actions as follows. First, if the partial fidelity update frames are encrypted, the sink fidelity controller transmits a request to a decrypt component (e.g., the decrypt component 126) to decrypt partial fidelity update frames. Next, if the partial fidelity update frames are encoded and/or compressed, the sink fidelity controller transmits a request to a decode component (e.g., the decode component 124) to decompress and/or decode the partial fidelity update frames. Next, the sink fidelity controller transmits a request to an integrate component (e.g., the integrate component 128) to parse the partial fidelity update frames and to integrate the partial fidelity update frames (U and V chroma components and the Y luma component). During its processing, the integrate component may determine the location of the partial fidelity updates within its corresponding base image either explicitly (e.g., by inspecting metadata included as a header within the frames) or implicitly (e.g., by inspecting the macroblock encoding of the frames). Next, the sink fidelity controller transmits a request to a compose component (e.g., the compose component 130) to compose a set of RGB image data in a display frame buffer (e.g., the display frame buffer 138) for output to a display (e.g., the display 142).

While some embodiments disclosed herein use an AVC/HEVC 4:2:0 base frame stream for simplicity and clarity, other embodiments utilize other lower-fidelity base frame streams in conjunction with higher-fidelity enhanced frame stream(s). Additionally, while some embodiments use stitching frames to transport fidelity improving data, other embodiments uses scaling frames to accomplish the same objective.

Information within the systems disclosed herein may be stored in any logical and physical construction capable of holding information on a computer readable medium including, among other structures, linked lists, file systems, flat files, indexed files, hierarchical databases, relational databases or object oriented databases. The data may be modeled using unique and foreign key relationships and indices. The unique and foreign key relationships and indices may be established between the various fields and tables to ensure both data integrity and data interchange performance.

Information may flow between the components disclosed herein using a variety of techniques. Such techniques include, for example, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Each of the processes disclosed herein depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a fidelity management system, a training system, or a testing system configured according to the examples and embodiments disclosed herein.

Example Source and Sink Devices

Figure 13:
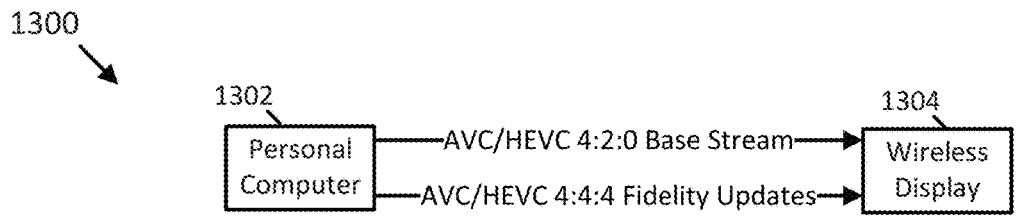
FIG. 13 illustrates a fidelity management system including a personal computer source and a wireless display sink in accordance with an embodiment of the present disclosure.

FIGS. 13-18 illustrate various examples of the fidelity management system 100 according to some embodiments. For instance, FIG. 13 illustrates a fidelity management system 1300 that includes a personal computer source device 1302 and a wireless display sink device 1304. As shown in FIG. 13, the personal computer source device 1302 is configured to transmit base image frames and fidelity update frames the wireless display sink device 1304 over a wireless data link. The base image frames are encoded to 4:2:0 and compressed using AVC and/or HEVC. The fidelity update frames that are encoded to 4:4:4 and are compressed using AVC and/or HEVC.

Figure 14:
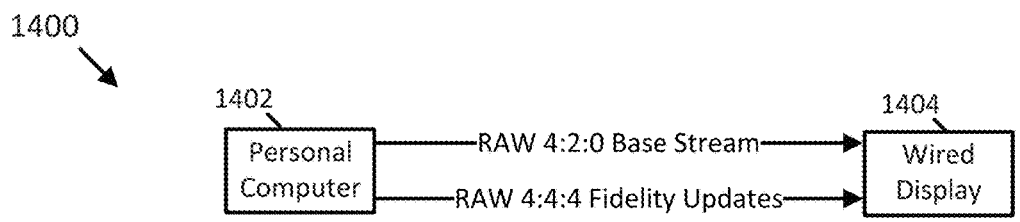
FIG. 14 illustrates a fidelity management system including a personal computer source and a wired display sink in accordance with an embodiment of the present disclosure.

FIG. 14 illustrates another fidelity management system 1400 that includes a personal computer source device 1402 and a wired display sink device 1404. As shown in FIG. 14, the personal computer source device 1402 is configured to transmit base image frames and fidelity update frames the wired display sink device 1404 over a wired data link. The base image frames are encoded to 4:2:0 and uncompressed. The fidelity update frames that are encoded to 4:4:4 and are not compressed.

Figure 15:
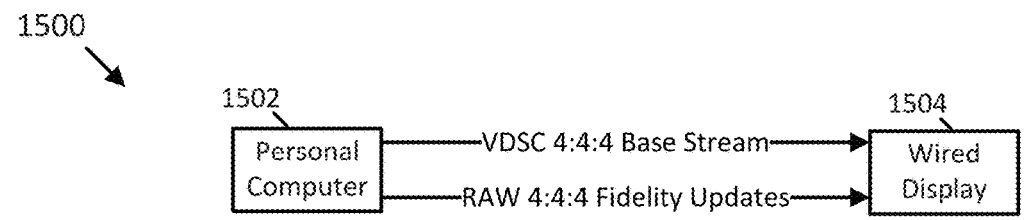
FIG. 15 illustrates another fidelity management system including a personal computer source and a wired display sink in accordance with an embodiment of the present disclosure.

FIG. 15 illustrates another fidelity management system 1500 that includes a personal computer source device 1502 and a wired display sink device 1504. As shown in FIG. 15, the personal computer source device 1502 is configured to transmit base image frames and fidelity update frames the wired display sink device 1504 over a wired data link. The base image frames are encoded to 4:4:4 and are compressed using VDSC. The fidelity update frames that are encoded to 4:4:4 and are not compressed.

Figure 16:
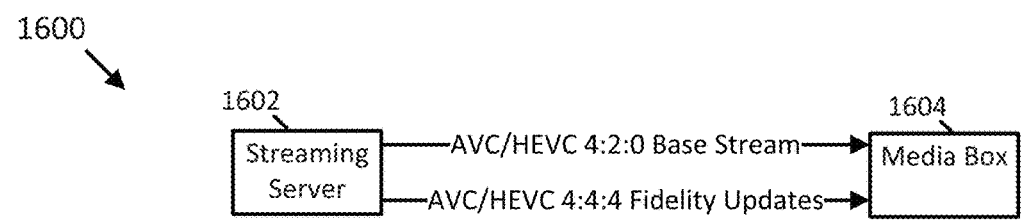
FIG. 16 illustrates a fidelity management system including a streaming server source and a media box sink in accordance with an embodiment of the present disclosure.

FIG. 16 illustrates another fidelity management system 1600 that includes a streaming server source device 1602 and a wired media box sink device 1604. As shown in FIG. 16, the streaming server source device 1602 is configured to transmit base image frames and fidelity update frames the wired media box sink device 1604 over a wired data link. The base image frames are encoded to 4:2:0 and compressed using AVC and/or HEVC. The fidelity update frames that are encoded to 4:4:4 and are compressed using AVC and/or HEVC.

Figure 17:
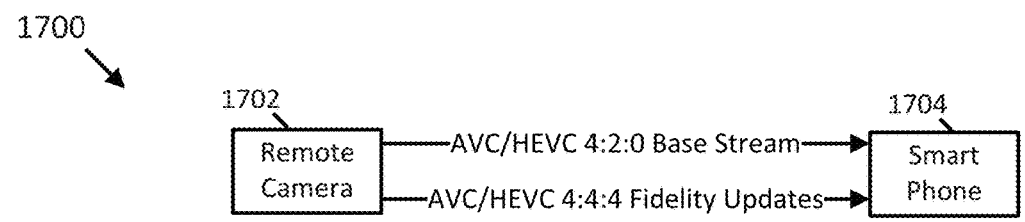
FIG. 17 illustrates a fidelity management system including a remote camera source and a smart phone sink in accordance with an embodiment of the present disclosure.

FIG. 17 illustrates another fidelity management system 1700 that includes a remote camera source device 1702 and a smart phone sink device 1704. As shown in FIG. 17, the remote camera source device 1702 is configured to transmit base image frames and fidelity update frames the smart phone sink device 1704 over a wireless data link. The base image frames are encoded to 4:2:0 and compressed using AVC and/or HEVC. The fidelity update frames that are encoded to 4:4:4 and are compressed using AVC and/or HEVC.

Figure 18:
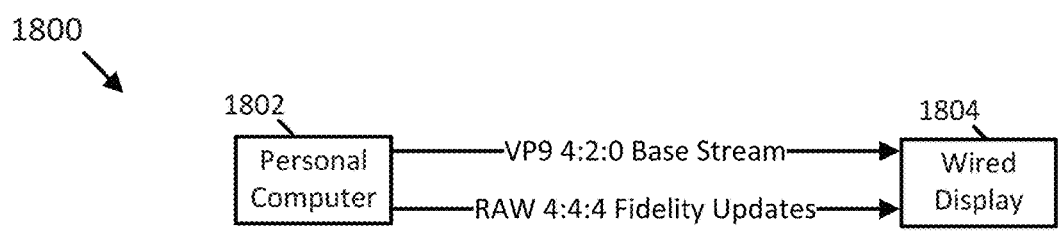
FIG. 18 illustrates a fidelity management system including a personal computer source and a wired display sink in accordance with an embodiment of the present disclosure.

FIG. 18 illustrates another fidelity management system 1800 that includes a personal computer source device 1802 and a wired display sink device 1804. As shown in FIG. 18, the personal computer source device 1802 is configured to transmit base image frames and fidelity update frames the wired display sink device 1804 over a wired data link. The base image frames are encoded to 4:2:0 and compressed using VP9. The fidelity update frames that are encoded to 4:4:4 and are not compressed.

Example System

Figure 12:
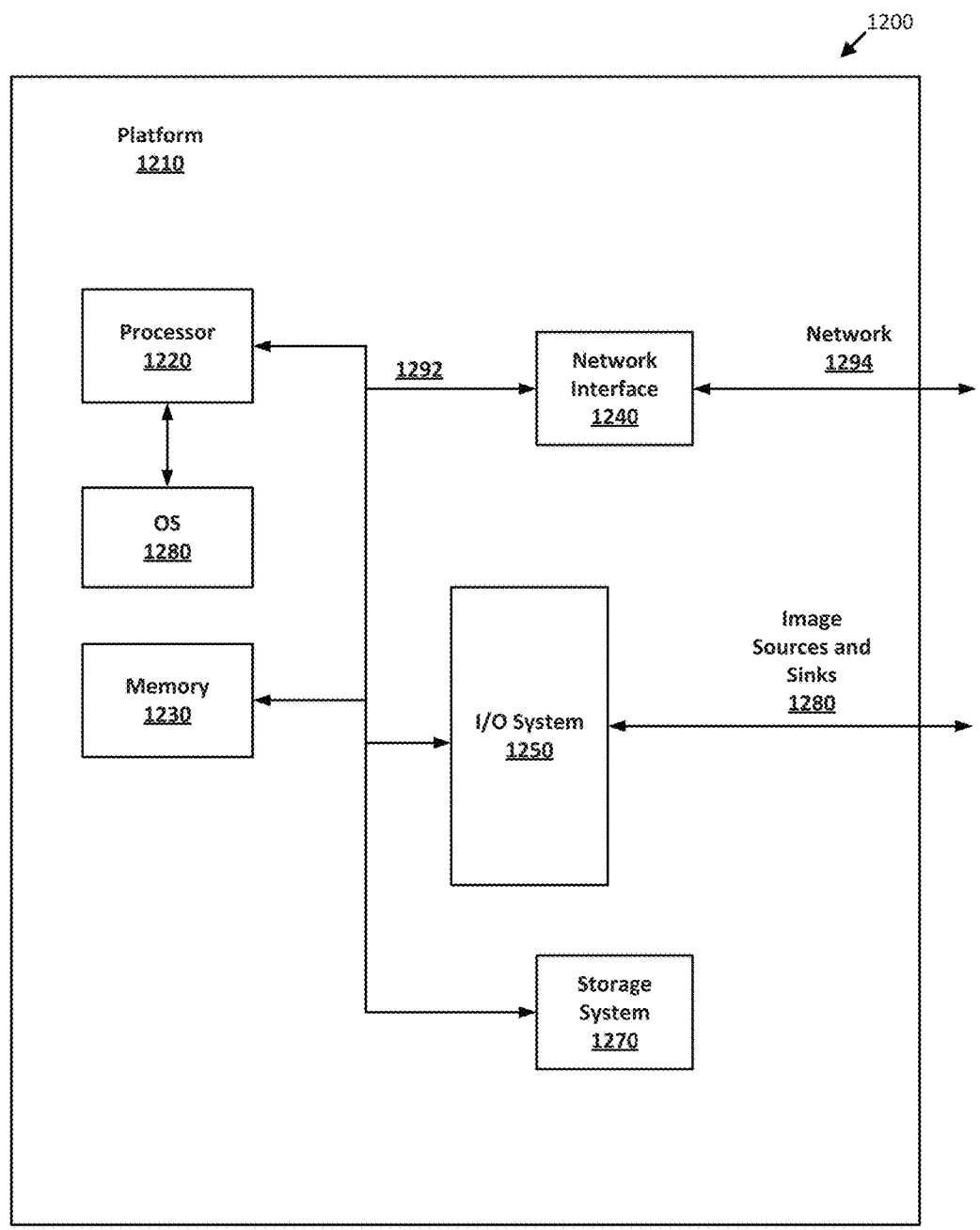
FIG. 12 illustrates a system platform configured to implement a fidelity management system in accordance with an embodiment of the present disclosure.

FIG. 12 illustrates an example system 1200 that may implement fidelity management systems and devices, as described herein. In some embodiments, system 1200 comprises a platform 1210 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, display, video encoder, video decoder, and so forth. Any combination of different devices may be used in certain embodiments.

In some embodiments, platform 1210 may comprise any combination of a processor 1220, a memory 1230, a network interface 1240, an input/output (I/O) system 1250, and a storage system 1270. As can be further seen, a bus and/or interconnect 1292 is also provided to allow for communication between the various components listed above and/or other components not shown. Platform 1210 can be coupled to a network 1294 through network interface 1240 to allow for communications with other computing devices, platforms or resources. Platform 1210 can be coupled to image sources and sinks (e.g. the camera 104, the image data store 106 and the display 108) through I/O system 1250 to allow for communication of image data with these devices. Other componentry and functionality not reflected in the block diagram of FIG. 12 will be apparent in light of this disclosure, and it will be appreciated that other embodiments are not limited to any particular hardware configuration.

Processor 1220 can be any suitable processor, and may include one or more coprocessors or controllers, such as an audio processor or a graphics processing unit, to assist in control and processing operations associated with system 1200. In some embodiments, the processor 1220 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1220 may be implemented as a complex instruction set computer (CISC) or a reduced instruction set computer (RISC) processor. In some embodiments, processor 1220 may be configured as an x86 instruction set compatible processor.

Memory 1230 can be implemented using any suitable type of digital storage including, for example, flash memory and/or random access memory (RAM). In some embodiments, the memory 1230 may include various layers of memory hierarchy and/or memory caches as are known to those of skill in the art. Memory 1230 may be implemented as a volatile memory device such as, but not limited to, a RAM, dynamic RAM (DRAM), or static RAM (SRAM) device. Storage system 1270 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1270 may comprise technology to increase the storage performance enhanced protection for valuable digital media when multiple hard drives are included.

Processor 1220 may be configured to execute an Operating System (OS) 1280 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1200, and therefore may also be implemented using any suitable existing or subsequently-developed platform.

Network interface circuit 1240 can be any appropriate network chip or chipset which allows for wired and/or wireless connection between other components of computer system 1200 and/or network 1294, thereby enabling system 1200 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1250 may be configured to interface between various I/O devices and other components of computer system 1200.

I/O system 1250 may include a graphics subsystem configured to perform processing of images. Graphics subsystem may be a graphics processing unit or a visual processing unit (VPU), for example. An analog or digital interface may be used to communicatively couple graphics subsystem and a display element. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1220 or any chipset of platform 1210. Under the control of the OS 1280 (or one or more software applications), platform 1210 may display processed video image sequences on the display. The images may be provided by the camera, image data store, or other sources, as described herein.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

In various embodiments, system 1200 may be implemented as a wireless system, a wired system, or a combination of both. When implemented as a wireless system, system 1200 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1200 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the spatially adaptive tone mapping methodologies disclosed herein to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1294. In other embodiments, the functionalities disclosed herein can be incorporated into other software applications, such as video editing applications, video analysis applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1200 may comprise additional, fewer, or alternative subcomponents as compared to those included in the example embodiment of FIG. 12.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein.

The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Further Example Embodiments

The following examples pertain to further embodiments, from which numerous permutations and configurations will be apparent.

Example 1 is a sink device comprising: a display buffer; an interface configured to couple to a data link; and at least one processor coupled to the interface and the display buffer and configured to receive, via the interface and the data link, a plurality of frames of image data, the plurality of frames including at least one fidelity update frame; to identify the at least one fidelity update frame within the plurality of frames; to parse the at least one fidelity update frame to identify at least one chroma value stored in the at least one fidelity update frame; and to store image data based on the at least one chroma value in the display buffer.

Example 2 includes the subject matter of Example 1, and further includes a display coupled to the display buffer and configured to render an output image based on the image data stored in the display buffer.

Example 3 includes the subject matter of Example 1 or 2, wherein the plurality of frames includes at least one base frame distinct from and corresponding to the at least one fidelity update frame.

Example 4 includes the subject matter of Example 3, wherein the at least one processor is configured to integrate the at least one fidelity update frame with the at least one base frame to produce the image data based on the at least one chroma value.

Example 5 includes the subject matter of Examples 3 or 4, wherein the at least one fidelity update frame has higher resolution than the at least one base frame and the at least one processor is configured to integrate the at least one fidelity update frame with the at least one base frame at least in part by extracting, from the at least one fidelity update frame, a plurality of chroma values of an individual pixel within the at least one base frame.

Example 6 includes the subject matter of any of Examples 3 through 5, wherein the at least one processor is configured to integrate the at least one fidelity update frame with the at least one base frame at least in part by replacing chroma values of a plurality of pixels within the at least one base frame with corresponding chroma values stored in the least one fidelity update frame.

Example 7 includes the subject matter of any of Examples 3 through 6, wherein the at least one fidelity update frame includes at least one partial base frame and the at least one processor is configured to integrate the at least one partial base frame with the at least one base frame at least in part by replacing a portion of the at least one base frame with the at least one partial base frame.

Example 8 includes the subject matter of any of Examples 3 through 7, wherein the at least one processor is configured to integrate the at least one fidelity update frame with the at least one base frame at least in part by replacing a chroma value of a pixel within the at least one base frame with a chroma value stored in the at least one partial fidelity update frame.

Example 9 includes the subject matter of any of Examples 3 through 8, wherein the at least one fidelity update frame includes at least one partial fidelity update frame and the at least one processor is configured to integrate the at least one partial fidelity update frame with the at least one base frame at least in part by replacing a chroma value of a pixel within the at least one base frame with a chroma value stored in the at least one partial fidelity update frame.

Example 10 includes the subject matter of any of Examples 3 through 9, wherein the at least one fidelity update frame includes at least one partial fidelity update frame and at least one partial base frame and the at least one processor is configured to: integrate the at least one partial base frame with the at least one base frame at least in part by replacing a portion of the at least one base frame with the at least one partial base frame; and integrate the at least one partial fidelity update frame with the at least one base frame at least in part by replacing a chroma value of a pixel within the at least one base frame with a chroma value stored in the at least one partial fidelity update frame.

Example 11 includes the subject matter of any of Examples 1 through 10, wherein the at least one fidelity update frame includes at least one partial fidelity update frame and at least one partial base frame and the at least one processor is configured to: integrate the at least one partial base frame with a base frame at least in part by replacing a luma value of a pixel within the base frame with a luma value stored in the at least one partial base frame; and integrate the at least one partial fidelity update frame with the base frame at least in part by replacing a chroma value of a pixel within the base frame with a chroma value stored in the at least one partial fidelity update frame.

Example 12 includes the subject matter of any of Examples 1 through 11, and further includes a memory storing one or more fidelity management policies applicable to determine whether to integrate the at least one fidelity update frame with a base frame, wherein the at least one processor is coupled to the memory and configured to identify at least one fidelity management policy from the one or more fidelity management policies and to apply the at least one fidelity management policy in response to receipt of at least one frame of the plurality of frames.

Example 13 includes the subject matter of any of Example 12, wherein the one or more fidelity management policies include at least one of a latency-biased policy and a fidelity-biased policy.

Example 14 includes the subject matter of Example 12 or 13, wherein the latency-biased policy specifies that a metric indicative of frame activity must transgress a threshold prior to identifying the at least one fidelity update frame. The threshold may be specific to the latency-biased policy.

Example 15 includes the subject matter of any of Examples 12 through 14, wherein the fidelity-biased policy specifies that that a metric indicative of frame activity must not transgress a threshold prior to identifying the at least one fidelity update frame. The threshold may be specific to the fidelity-biased policy.

Example 16 includes the subject matter of any of Examples 1 through 15, wherein the sink device includes at least one of a wireless display, a wired display, a media box, and a smart phone.

Example 17 is a method of increasing image fidelity using a sink device including a display buffer, the method comprising: receiving, at the sink device, a plurality of frames of image data, the plurality of frames including at least one fidelity update frame; identifying the at least one fidelity update frame within the plurality of frames; parsing the at least one fidelity update frame to identify at least one chroma value stored in the at least one fidelity update frame; and storing image data based on the at least one chroma value in the display buffer.

Example 18 includes the subject matter of Example 17, and further includes rendering an output image based on the image data stored in the display buffer.

Example 19 includes the subject matter of Example 17 or 18, wherein receiving the plurality of frames includes receiving at least one base frame distinct from and corresponding to the at least one fidelity update frame.

Example 20 includes the subject matter of Example 19, and further includes integrating the at least one fidelity update frame with the at least one base frame to produce the image data based on the at least one chroma value.

Example 21 includes the subject matter of Example 19 or 20, wherein the at least one fidelity update frame has higher resolution than the at least one base frame and the method further comprises integrating the at least one fidelity update frame with the at least one base frame at least in part by extracting, from the at least one fidelity update frame, a plurality of chroma values of an individual pixel within the at least one base frame.

Example 22 includes the subject matter of any of Examples 19 through 21, and further includes integrating the at least one fidelity update frame with the at least one base frame at least in part by replacing chroma values of a plurality of pixels within the at least one base frame with corresponding chroma values stored in the least one fidelity update frame.

Example 23 includes the subject matter of any of Examples 19 through 22, wherein the at least one fidelity update frame includes at least one partial base frame and the method further comprises integrating the at least one partial base frame with the at least one base frame at least in part by replacing a portion of the at least one base frame with the at least one partial base frame.

Example 24 includes the subject matter of any of Examples 19 through 23, and further includes integrating the at least one fidelity update frame with the at least one base frame at least in part by replacing a chroma value of a pixel within the at least one base frame with a chroma value stored in the at least one partial fidelity update frame.

Example 25 includes the subject matter of any of Examples 19 through 24, wherein the at least one fidelity update frame includes at least one partial fidelity update frame and the method further comprises integrating the at least one partial fidelity update frame with the at least one base frame at least in part by replacing a chroma value of a pixel within the at least one base frame with a chroma value stored in the at least one partial fidelity update frame.

Example 26 includes the subject matter of any of Examples 19 through 25, wherein the at least one fidelity update frame includes at least one partial fidelity update frame and at least one partial base frame and the method further comprises: integrating the at least one partial base frame with the at least one base frame at least in part by replacing a portion of the at least one base frame with the at least one partial base frame; and integrating the at least one partial fidelity update frame with the at least one base frame at least in part by replacing a chroma value of a pixel within the at least one base frame with a chroma value stored in the at least one partial fidelity update frame.

Example 27 includes the subject matter of any of Examples 17 through 26, wherein the at least one fidelity update frame includes at least one partial fidelity update frame and at least one partial base frame and the method further comprises: integrating the at least one partial base frame with a base frame at least in part by replacing a luma value of a pixel within the base frame with a luma value stored in the at least one partial base frame; and integrating the at least one partial fidelity update frame with the base frame at least in part by replacing a chroma value of a pixel within the base frame with a chroma value stored in the at least one partial fidelity update frame.

Example 28 includes the subject matter of any of Examples 17 through 27, and further includes identifying at least one fidelity management policy from one or more fidelity management policies and applying the at least one fidelity management policy in response to receipt of at least one frame of the plurality of frames.

Example 29 includes the subject matter of Examples 28, wherein identifying the at least one fidelity management policy includes identifying at least one of a latency-biased policy and a fidelity-biased policy.

Example 30 includes the subject matter of Example 28 or 29, wherein identifying the at least one latency-biased policy includes identifying a latency-biased policy specifying that a metric indicative of frame activity must transgress a threshold prior to identifying the at least one fidelity update frame. The threshold may be specific to the latency-biased policy.

Example 31 includes the subject matter of any of Examples 28 through 30, wherein identifying the at least one fidelity-biased policy includes identifying a fidelity-biased policy specifying that that a metric indicative of frame activity must not transgress a threshold prior to identifying the at least one fidelity update frame. The threshold may be specific to the fidelity-biased policy.

Example 32 is a non-transient computer program product encoded with instructions that when executed by one or more processors cause a process for increasing image fidelity to be carried out, the process comprising: receiving a plurality of frames of image data, the plurality of frames including at least one fidelity update frame; identifying the at least one fidelity update frame within the plurality of frames; parsing the at least one fidelity update frame to identify at least one chroma value stored in the at least one fidelity update frame; and storing image data based on the at least one chroma value in a display buffer.

Example 33 includes the subject matter of Example 32, and further includes rendering an output image based on the image data stored in the display buffer.

Example 34 includes the subject matter of Example 32 or 33, wherein receiving the plurality of frames includes receiving at least one base frame distinct from and corresponding to the at least one fidelity update frame.

Example 35 includes the subject matter of Example 34, and further includes integrating the at least one fidelity update frame with the at least one base frame to produce the image data based on the at least one chroma value.

Example 36 includes the subject matter of Example 34 or 35, wherein the at least one fidelity update frame has higher resolution than the at least one base frame and the process further comprises integrating the at least one fidelity update frame with the at least one base frame at least in part by extracting, from the at least one fidelity update frame, a plurality of chroma values of an individual pixel within the at least one base frame.

Example 37 includes the subject matter of any of Examples 34 through 36, and further includes integrating the at least one fidelity update frame with the at least one base frame at least in part by replacing chroma values of a plurality of pixels within the at least one base frame with corresponding chroma values stored in the least one fidelity update frame.

Example 38 includes the subject matter of any of Examples 34 through 37, wherein the at least one fidelity update frame includes at least one partial base frame and the process further comprises integrating the at least one partial base frame with the at least one base frame at least in part by replacing a portion of the at least one base frame with the at least one partial base frame.

Example 39 includes the subject matter of any of Examples 34 through 38, and further includes integrating the at least one fidelity update frame with the at least one base frame at least in part by replacing a chroma value of a pixel within the at least one base frame with a chroma value stored in the at least one partial fidelity update frame.

Example 40 includes the subject matter of any of Examples 34 through 39, wherein the at least one fidelity update frame includes at least one partial fidelity update frame and the process further comprises integrating the at least one partial fidelity update frame with the at least one base frame at least in part by replacing a chroma value of a pixel within the at least one base frame with a chroma value stored in the at least one partial fidelity update frame.

Example 41 includes the subject matter of any of Examples 34 through 40, wherein the at least one fidelity update frame includes at least one partial fidelity update frame and at least one partial base frame and the process further comprises: integrating the at least one partial base frame with the at least one base frame at least in part by replacing a portion of the at least one base frame with the at least one partial base frame; and integrating the at least one partial fidelity update frame with the at least one base frame at least in part by replacing a chroma value of a pixel within the at least one base frame with a chroma value stored in the at least one partial fidelity update frame.

Example 42 includes the subject matter of any of Examples 32 through 41, wherein the at least one fidelity update frame includes at least one partial fidelity update frame and at least one partial base frame and the process further comprises: integrating the at least one partial base frame with a base frame at least in part by replacing a luma value of a pixel within the base frame with a luma value stored in the at least one partial base frame; and integrating the at least one partial fidelity update frame with the base frame at least in part by replacing a chroma value of a pixel within the base frame with a chroma value stored in the at least one partial fidelity update frame.

Example 43 includes the subject matter of any of Examples 32 through 42, and further includes identifying at least one fidelity management policy from one or more fidelity management policies and applying the at least one fidelity management policy in response to receipt of at least one frame of the plurality of frames.

Example 44 includes the subject matter of Examples 43, wherein identifying the at least one fidelity management policy includes identifying at least one of a latency-biased policy and a fidelity-biased policy.

Example 45 includes the subject matter of Example 43 or 44, wherein identifying the at least one latency-biased policy includes identifying a latency-biased policy specifying that a metric indicative of frame activity must transgress a threshold prior to identifying the at least one fidelity update frame. The threshold may be specific to the latency-biased policy.

Example 46 includes the subject matter of any of Examples 43 through 44, wherein identifying the at least one fidelity-biased policy includes identifying a fidelity-biased policy specifying that that a metric indicative of frame activity must not transgress a threshold prior to identifying the at least one fidelity update frame. The threshold may be specific to the fidelity-biased policy.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A sink device comprising:
   a display buffer;
   an interface configured to couple to a data link; and
   at least one processor coupled to the interface and the display buffer and configured to
      receive, via the interface and the data link, a plurality of frames of image data, the plurality of frames including at least one partial fidelity update frame and at least one base frame, the at least one partial fidelity update frame being applicable to a portion of the at least one base frame;
      identify the at least one partial fidelity update frame within the plurality of frames;
      parse the at least one partial fidelity update frame to identify at least one chroma value stored in the at least one partial fidelity update frame;
      integrate the at least one partial fidelity update frame with the at least one base frame at least in part by replacing a chroma value of a pixel within the at least one base frame with the at least one chroma value; and store image data based on the at least one base frame integrated with the at least one partial fidelity update frame in the display buffer.

2. The sink device of claim 1, further comprising a display coupled to the display buffer and configured to render an output image based on the image data stored in the display buffer.

3. The sink device of claim 1, wherein the plurality of frames further comprises at least one fidelity update frame and at least one other base frame and the at least one processor is further configured to integrate the at least one fidelity update frame with the at least one other base frame.

4. The sink device of claim 3, wherein the at least one fidelity update frame includes at least one partial base frame and the at least one processor is configured to integrate the at least one partial base frame with the at least one other base frame at least in part by replacing a portion of the at least one other base frame with the at least one partial base frame.

5. The sink device of claim 3, wherein the at least one processor is configured to integrate the at least one fidelity update frame with the at least one other base frame at least in part by replacing a chroma value of a pixel within the at least one other base frame with a chroma value stored in the at least one fidelity update frame.

6. The sink device of claim 3, wherein the at least one fidelity update frame includes at least one other partial fidelity update frame and at least one partial base frame and the at least one processor is configured to:
integrate the at least one partial base frame with the at least one other base frame at least in part by replacing a portion of the at least one other base frame with the at least one partial base frame; and
integrate the at least one other partial fidelity update frame with the at least one other base frame at least in part by replacing a chroma value of a pixel within the at least one other base frame with a chroma value stored in the at least one other partial fidelity update frame.

7. The sink device of claim 3, wherein the at least one fidelity update frame includes at least one other partial fidelity update frame and at least one partial base frame and the at least one processor is configured to:
integrate the at least one partial base frame with the at least one other base frame at least in part by replacing a luma value of a pixel within the at least one other base frame with a luma value stored in the at least one partial base frame; and
integrate the at least one other partial fidelity update frame with the at least one other base frame at least in part by replacing a chroma value of a pixel within the at least one other base frame with a chroma value stored in the at least one other partial fidelity update frame.

8. The sink device of claim 1, wherein the at least one partial fidelity update frame has higher resolution than the at least one base frame and the at least one processor is configured to integrate the at least one partial fidelity update frame with the at least one base frame at least in part by extracting, from the at least one partial fidelity update frame, a plurality of chroma values applicable to an individual pixel within the at least one base frame.

9. The sink device of claim 1, wherein the at least one processor is configured to integrate the at least one partial fidelity update frame with the at least one base frame at least in part by replacing chroma values of a plurality of pixels within the at least one base frame with corresponding chroma values stored in the at least one partial fidelity update frame.

10. The sink device of claim 1, further comprising a memory storing one or more fidelity management policies applicable to determine whether to integrate the at least one partial fidelity update frame with the at least one base frame, wherein the at least one processor is coupled to the memory and configured to identify at least one fidelity management policy from the one or more fidelity management policies and to apply the at least one fidelity management policy in response to receipt of at least one frame of the plurality of frames.

11. The sink device of claim 10, wherein the one or more fidelity management policies include at least one of a latency-biased policy and a fidelity-biased policy.

12. The sink device of claim 11, wherein the latency-biased policy specifies that a metric indicative of frame activity must transgress a threshold prior to identifying the at least one partial fidelity update frame.

13. The sink device of claim 11, wherein the fidelity-biased policy specifies that that a metric indicative of frame activity must not transgress a threshold prior to identifying the at least one partial fidelity update frame.

14. The sink device of claim 1, wherein the sink device includes at least one of a wireless display, a wired display, a media box, and a smart phone.

15. A method of increasing image fidelity using a sink device including a display buffer, the method comprising:
receiving, at the sink device, a plurality of frames of image data, the plurality of frames including at least one partial fidelity update frame and at least one base frame, the at least one partial fidelity update frame being applicable to a portion of the at least one base frame;
identifying the at least one partial fidelity update frame within the plurality of frames;
parsing the at least one partial fidelity update frame to identify at least one chroma value stored in the at least one partial fidelity update frame;
integrating the at least one partial fidelity update frame with the at least one base frame at least in part by replacing a chroma value of a pixel within the at least one base frame with the at least one chroma value; and
storing image data based on the at least one base frame integrated with the at least one partial fidelity update frame in the display buffer.

16. The method of claim 15, further comprising rendering an output image based on the image data stored in the display buffer.

17. The method of claim 15, further comprising integrating at least one fidelity update frame included within the plurality of frames with at least one other base frame included within the plurality of frames.

18. The method of claim 15, wherein the at least one partial fidelity update frame has higher resolution than the at least one base frame and the method further comprises integrating the at least one partial fidelity update frame with the at least one base frame at least in part by extracting, from the at least one partial fidelity update frame, a plurality of chroma values applicable to an individual pixel within the at least one base frame.

19. A non-transient computer program product encoded with instructions that when executed by one or more processors cause a process for increasing image fidelity to be carried out, the process comprising:
receiving a plurality of frames of image data, the plurality of frames including at least one partial fidelity update frame and at least one base frame, the at least one partial fidelity update frame being applicable to a portion of the at least one base frame;

identifying the at least one partial fidelity update frame within the plurality of frames;

parsing the at least one partial fidelity update frame to identify at least one chroma value stored in the at least one partial fidelity update frame;

integrating the at least one partial fidelity update frame with the at least one base frame at least in part by replacing a chroma value of a pixel within the at least one base frame with the at least one chroma value; and storing image data based on the at least one base frame integrated with the at least one partial fidelity update frame in a display buffer.

20. The computer program product of claim 19, the process further comprising rendering an output image based on the image data stored in the display buffer.

21. The computer program product of claim 19, the process further comprising integrating at least one fidelity update frame included within the plurality of frames with at least one other base frame included within the plurality of frames.

\* \* \* \* \*